(12) United States Patent
Kano et al.

(10) Patent No.: US 10,916,809 B2
(45) Date of Patent: *Feb. 9, 2021

(54) LITHIUM SECONDARY BATTERY INCLUDING LITHIUM-ION CONDUCTIVE NONAQUEOUS ELECTROLYTE

(71) Applicant: Panasonic Intellectual Property Management Co., Ltd., Osaka (JP)

(72) Inventors: Akira Kano, Osaka (JP); Ryohei Miyamae, Osaka (JP); Kiyohiro Isii, Osaka (JP); Junichi Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,134

(22) Filed: Jan. 29, 2019

(65) Prior Publication Data

US 2019/0280340 A1  Sep. 12, 2019

(30) Foreign Application Priority Data

Mar. 9, 2018 (JP) ................. 2018-042780

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 4/13* (2013.01); *H01M 4/661* (2013.01);
(Continued)

(58) Field of Classification Search
CPC .... H01M 10/0587; H01M 4/13; H01M 4/661; H01M 4/668; H01M 4/76;
(Continued)

(56) References Cited

U.S. PATENT DOCUMENTS

2006/0110661 A1  5/2006 Lee et al.
2011/0008671 A1* 1/2011 Miyahisa ............ H01M 4/0435
429/164

(Continued)

FOREIGN PATENT DOCUMENTS

JP  2001-243957  9/2001
JP  2006-156351  6/2006
JP  2016-527680  9/2016

*Primary Examiner* — Haroon S. Sheikh
*Assistant Examiner* — Patrick Marshall Greene
(74) *Attorney, Agent, or Firm* — McDermott Will and Emery LLP

(57) ABSTRACT

A lithium secondary battery includes a wound electrode group and a lithium-ion conductive nonaqueous electrolyte. The wound electrode group includes a positive electrode, a negative electrode, and a separator between the positive electrode and the negative electrode. The negative electrode includes a negative electrode current collector. The negative electrode current collector includes: a layer having a first surface facing outward of the winding of the electrode group and a second surface facing inward of the winding of the electrode group; first protrusions protruding from the first surface; and second protrusions protruding from the second surface. Lithium metal is deposited on the first surface and the second surface by charging. A second average height of the second protrusions is higher than a first average height of the first protrusions.

19 Claims, 4 Drawing Sheets

(51) Int. Cl.
  *H01M 4/66*      (2006.01)
  *H01M 10/0525*   (2010.01)
  *H01M 4/76*      (2006.01)
  *H01M 4/02*      (2006.01)
  *H01M 10/052*    (2010.01)

(52) U.S. Cl.
  CPC ............ *H01M 4/668* (2013.01); *H01M 4/76* (2013.01); *H01M 10/0525* (2013.01); *H01M 10/052* (2013.01); *H01M 2004/021* (2013.01); *H01M 2004/027* (2013.01)

(58) Field of Classification Search
  CPC ........... H01M 10/0525; H01M 10/052; H01M 2004/021; H01M 2004/027
  See application file for complete search history.

(56) References Cited

U.S. PATENT DOCUMENTS

2015/0280212 A1    10/2015   Son et al.
2018/0351212 A1*   12/2018   Matsui .............. H01M 10/0587

\* cited by examiner

LITHIUM SECONDARY BATTERY INCLUDING LITHIUM-ION CONDUCTIVE NONAQUEOUS ELECTROLYTE

BACKGROUND

1. Technical Field

The present disclosure relates to a lithium secondary battery including a lithium-ion conductive nonaqueous electrolyte.

2. Description of the Related Art

Nonaqueous electrolyte secondary batteries are used, for example, for information and communications technology (ICT), such as personal computers and mobile phones, for cars, and for power storage. Nonaqueous electrolyte secondary batteries used for such purposes are required to have further higher capacities. As high-capacity nonaqueous electrolyte secondary batteries, lithium-ion batteries are known. The high capacity of a lithium-ion battery can be achieved by using, for example, a combination of graphite and an alloy active material, such as a silicon compound, as the negative electrode active material. However, the increase in capacity of a lithium-ion battery is reaching the limit.

A lithium secondary battery is promising as a high-capacity nonaqueous electrolyte secondary battery having a capacity higher than that of a lithium-ion battery. In the lithium secondary battery, lithium metal is deposited on the negative electrode by charging, and the lithium metal is dissolved in a nonaqueous electrolyte by discharging.

In lithium secondary batteries, it has been investigated to improve, for example, the shape of the negative electrode current collector, from the viewpoint of reducing a deterioration in battery characteristics by deposition of the lithium metal in a dendrite form. For example, Japanese Unexamined Patent Application Publication No. 2001-243957 (PTL 1) proposes to control the ten-point average roughness Rz of the lithium metal deposition surface of the negative electrode current collector to 10 μm or less. Japanese Unexamined Patent Application Publication (Translation of PCT Application) No. 2016-527680 (PTL 2) proposes a lithium secondary battery using a negative electrode including a porous metal current collector and lithium metal inserted into the pores of the current collector. Japanese Unexamined Patent Application Publication No. 2006-156351 (PTL 3) proposes a lithium metal polymer secondary battery using a negative electrode current collector having a surface provided with a plurality of recesses having a prescribed shape.

SUMMARY

One non-limiting and exemplary embodiment provides a lithium secondary battery including a wound electrode group in which expansion of a negative electrode by charging is reduced.

In one general aspect, the techniques disclosed here feature a lithium secondary battery including a wound electrode group and a lithium-ion conductive nonaqueous electrolyte. The wound electrode group includes a positive electrode, a negative electrode, and a separator between the positive electrode and the negative electrode. The negative electrode includes a negative electrode current collector. The negative electrode current collector includes: a layer having a first surface facing outward of the winding of the electrode group and a second surface facing inward of the winding of the electrode group; first protrusions protruding from the first surface; and second protrusions protruding from the second surface. Lithium metal is deposited on the first surface and the second surface by charging. A second average height of the second protrusions is higher than a first average height of the first protrusions.

According to embodiments of the present disclosure, in a lithium secondary battery including a wound electrode group, expansion of the negative electrode due to charging can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
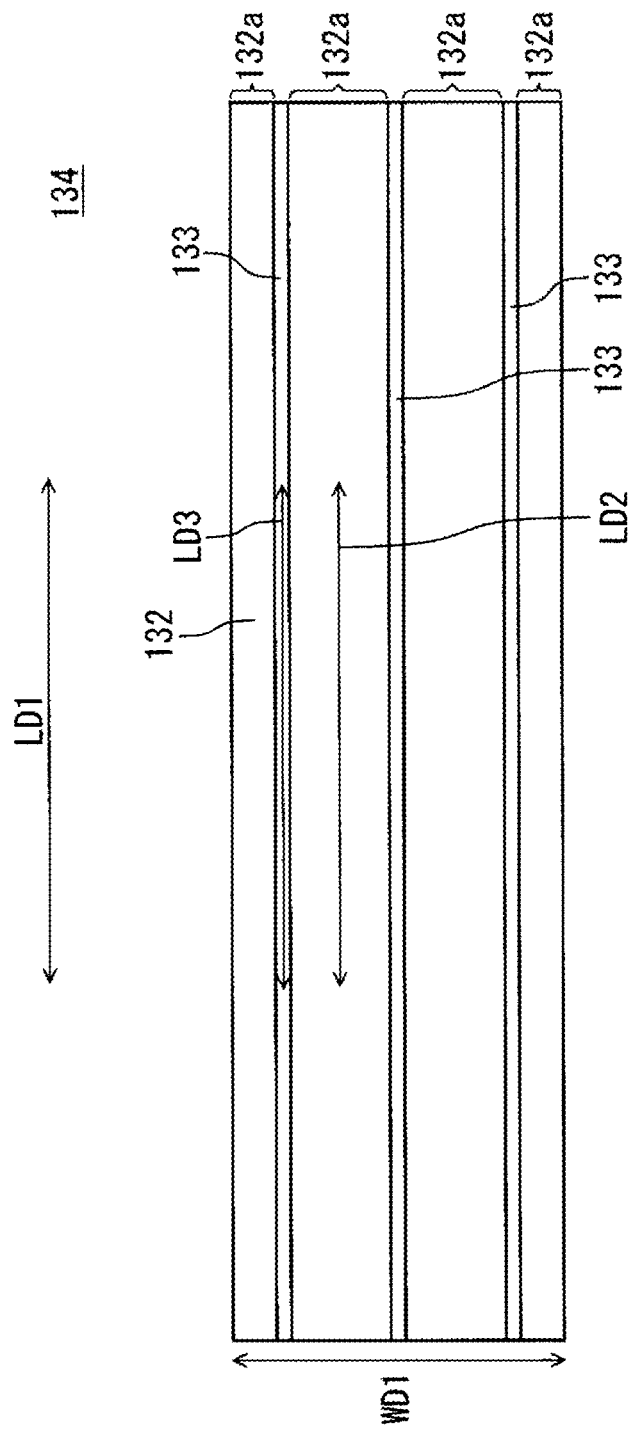
FIG. 1 is a plan view schematically illustrating a negative electrode current collector used in a lithium secondary battery according to an embodiment of the present disclosure.

Underlying Knowledge Forming Basis of the Present Disclosure

An embodiment of the present disclosure relates to a lithium secondary battery using lithium metal as a negative electrode active material and including a wound electrode group. More specifically, the embodiment of the present disclosure relates to an improvement of the negative electrode current collector in the wound electrode group. In lithium secondary batteries, lithium metal in a dendrite form may be deposited on the negative electrode by charging. Furthermore, generation of dendrites may increase the specific surface area of the negative electrode and increase a side reaction. Accordingly, the discharge capacity and cycling characteristics are apt to decrease. Regarding this, PTL 1 teaches that the generation of dendrites is reduced by controlling the ten-point average roughness (Rz) of the lithium metal deposition surface of the negative electrode to 10 μm or less to give a high charge/discharge efficiency.

In addition, in lithium secondary batteries, since lithium metal is deposited on the negative electrode during charging, the amount of expansion of the negative electrode is particularly apt to increase. In the present specification, the term "expansion of negative electrode" means that the total of the volume of the negative electrode and the volume of the deposited lithium metal is increased. In particular, when lithium metal is deposited in a dendrite form, the expansion amount is further increased. In a cylindrical lithium battery including a wound electrode group, a stress is generated by excessive expansion of the negative electrode. In order to absorb the change in the volume of the negative electrode during charge and discharge, PTL 2 proposes use of, for example, a porous copper or nickel negative electrode current collector having a pore rate of 50% to 99% and a pore size of 5 to 500 µm. In addition, in the negative electrode current collector of PTL 3, recesses for securing spaces for forming lithium metal in a dendrite form are disposed.

The stress due to deposition of lithium metal is released, in a coin-shaped electrode group, from the main surface and the side surface of the negative electrode and is released, in a laminated electrode group, from the end of the negative electrode. In contrast, in a wound electrode group, the deposition of lithium metal causes a stress due to a tensile strain in the circumferential direction in a cross section perpendicular to the winding axis of the electrode group. In the wound electrode group, the stress due to deposition of lithium metal is less likely released from the inner circumferential side of the electrode group and the end of the negative electrode, and therefore the stress heads for the outer circumferential side of the electrode group. Thus, in a wound electrode group, a stress is less likely dispersed, compared to other electrode groups, such as coin-shaped and laminated electrode groups, and excessive expansion of the negative electrode is apt to occur.

In the present specification, the negative electrode current collector of the wound electrode group includes a first surface facing outward of the winding of the electrode group and a second surface facing inward of the winding of the electrode group. That is, the first surface faces a direction away from the winding axis of the electrode group, and the second surface faces a direction towards the winding axis of the electrode group. Hereinafter, in a negative electrode current collector, the side facing outward of the winding of the electrode group may be referred to as the "outer side", and the side facing inward of the winding of the electrode group may be referred to as the "inner side". In the wound electrode group, because of a stress due to a tensile strain as mentioned above, the pressure applied to the lithium metal deposited by charging on the first surface on the outer side of the negative electrode current collector is higher than that applied to the lithium metal deposited by charging on the second surface on the inner side of the negative electrode current collector. This high pressure compresses the lithium metal deposited on the first surface. In contrast, the lithium metal deposited on the second surface is less likely compressed, and the thickness of the lithium metal deposited on the second surface becomes larger than that on the first surface.

As described above, in a wound electrode group, the stress due to deposition of lithium metal heads for the outer circumferential side from the inner circumferential side. Consequently, the pressure applied to the surface of the negative electrode current collector by the stress is higher on the second surface on the inner side than on the first surface on the outer side of the negative electrode current collector in the wound electrode group. Hereinafter, the pressure applied to a surface of the negative electrode current collector may be referred to as surface pressure. If the difference between the surface pressures on the first surface and the second surface is excessively large, the deposition of lithium metal on the negative electrode surface is apt to be uneven, and therefore the negative electrode may locally excessively expand. In addition, the charge/discharge efficiency may be decreased.

In the negative electrode current collector of PTL 2 or PTL 3, lithium metal is deposited in the spaces of pores or recesses by charging. In PTL 2 and PTL 3, basically, laminated or coin-shaped electrode groups are supposed. Accordingly, the lithium metal in the pores or the recesses is less likely applied with the pressure generated in the electrode group. Even if the negative electrode current collector of PTL 2 or PTL 3 is used in a wound electrode group, uneven deformation is easily caused by winding. Consequently, the stress is unevenly applied to the deposited lithium metal, and the expansion of the negative electrode by charging is apt to be uneven. Accordingly, it is difficult to sufficiently reduce the expansion of the negative electrode during charging. In addition, the lithium metal in pores or recesses is less likely applied with the stress and is therefore easily peeled off from the wall surface of the current collector. Since the peeled lithium metal cannot be dissolved during discharging, the charge/discharge efficiency is decreased.

The present inventors diligently studied to solve the above-mentioned problems and, as a result, arrived at the lithium secondary battery according to the present disclosure. The lithium secondary battery according to one aspect of the present disclosure includes a wound electrode group and a lithium-ion conductive nonaqueous electrolyte. The wound electrode group includes a positive electrode, a negative electrode, and a separator between the positive electrode and the negative electrode. The negative electrode includes a negative electrode current collector. The negative electrode current collector includes a layer. This layer has a first surface and a second surface opposite the first surface. The negative electrode current collector further has first protrusions protruding from the first surface and second protrusions protruding from the second surface. On the first surface and the second surface, lithium metal is deposited by charging. The first surface and the second surface are the outer surface and the inner surface, respectively, of the negative electrode current collector in the electrode group. The second average height of the second protrusions is higher than the first average height of the first protrusions.

According to the above-described aspect of the present disclosure, in the wound electrode group, a negative electrode current collector provided with first protrusion on the first surface on the outer side and second protrusions on the second surface on the inner side is used. The first protrusions and the second protrusions can secure spaces for depositing lithium metal in the vicinities of the first surface and the second surface, and therefore the change in the apparent volume of the negative electrode due to deposition of the lithium metal can be reduced. In the present specification, the term "apparent volume of a negative electrode" means the total volume of the volume of the negative electrode, the volume of the deposited lithium metal, and the volume of the spaces secured by the first protrusions and the second protrusions. By adjusting the second average height of the second protrusions to be higher than the first average height of the first protrusions, the increase in the volume can be effectively absorbed by the spaces between the second protrusions, even if the thickness of the lithium metal deposited on the second surface is increased by charging. Accordingly, increase in the apparent volume of the negative electrode can be reduced.

Thus, in each of the first surface and the second surface, the first protrusions and the second protrusions can previously secure spaces having volumes suitable for the thickness of the lithium metal deposited by charging. Accordingly, there is no need to decrease the apparent volume accounting for the negative electrode and/or the positive electrode at the initial stage for anticipation of expansion of the negative electrode. As a result, a high discharge capacity can be easily secured. In addition, even if lithium metal is generated in a dendrite form, the lithium metal can be accommodated in the spaces in the vicinities of the first surface and the second surface. Furthermore, since the electrode group is a winding type, a certain degree of pressure is applied to the lithium metal deposited in the spaces formed by the first protrusions and the second protrusions. Accordingly, the lithium metal deposited in the spaces is less likely peeled off, unlike the cases of PTL 2 and PTL 3. Accordingly, decrease of the charge/discharge efficiency can also be reduced. In addition, since an appropriate pressure is applied to the deposited lithium metal, the deposition itself of the lithium metal in a dendrite form can be reduced, even if the surface of the negative electrode current collector is not smoothened, unlike the case in PTL 1.

The first average height can be determined by, for example, arbitrarily selecting ten first protrusions in a cross-sectional photograph in the thickness direction of the negative electrode current collector, measuring the distances from the first surface to the respective tips of the ten first protrusions as the heights of the ten first protrusions, and averaging these heights of the ten first protrusions. In addition, the first average height may be determined by cutting out a predetermined area (e.g., 5 cm$^2$) or a plurality of arbitrary regions on the first surface of the negative electrode current collector and averaging the heights of a plurality of arbitrary first protrusions present in the predetermined area or the plurality of regions. In such a case, the first average height may be determined by taking the plurality of cross-sectional photographs in the predetermined area or the plurality of arbitrary regions, measuring the distance from the first surface to the tip of each of the plurality of first protrusions in these cross-sectional photographs as the first height, and averaging the heights of the plurality of first protrusions. The plurality of first protrusions that are measured may be disposed over the entire first surface or may be disposed only in a very small portion. In each of the first protrusions, when the tip is not flat, the maximum height from the first surface is defined as the height of the first protrusion. The second average height can be determined in accordance with the case of the first average height except that the distances from the second surface to the respective tips of the second protrusions are defined as the heights of the respective second protrusions. The first average height and the second average height may be determined based on a cross-sectional photograph of the electrode group allowing observation of a cross section of the negative electrode current collector in the thickness direction.

When the first surface is rough, the surface roughness Rz of the first surface may be 1 μm or less. Similarly, when the second surface is rough, the surface roughness Rz of the second surface may be 1 μm or less. The height of each of the first protrusions may be higher than 1 μm, and the height of each of the second protrusions may be higher than 1 μm. The heights of the first protrusions and the second protrusions are measured by unwinding the electrode group such that the first surface and the second surface are extended to a flat state. When the first surface is rough, the height of each first protrusion is measured using the top of the rough surface as the basis. Similarly, when the second surface is rough, the height of each second protrusion is measured using the top of the rough surface as the basis.

From the viewpoint of easily securing a higher discharge capacity while maintaining the excellent expansion-reducing effect of the negative electrode, the difference between the second average height and the first average height may be 3% or more and 50% or less of the first average height.

The first protrusions and the second protrusions may be each in contact with the separator. More specifically, the first protrusions may be in contact with the separator surface facing the first surface, and the second protrusions may be in contact with the separator surface facing the second surface. In such cases, the presence of the first protrusions and the second protrusions secures spaces between the negative electrode current collector and the separator. Accordingly, lithium metal is deposited in these spaces by charging. The influence of the relationship between the first average height and the second average height is remarkably exhibited by the deposition of lithium metal in such spaces. Accordingly, even if the thickness of the lithium metal deposited on the second surface is large, the change in the apparent volume of the negative electrode can be reduced. In addition, the contact of the first protrusions and the second protrusions with the separator reduces the deposition of lithium metal on the tips of the first protrusions and the second protrusions. Consequently, local expansion of the negative electrode can be also reduced.

Each of the first protrusions protrudes from the first surface toward the separator surface facing the first surface. Each of the second protrusions protrudes from the second surface toward the separator surface facing the second surface.

The material of the first protrusions may be different from that of the negative electrode current collector layer. The material of the second protrusions may be different from that of the negative electrode current collector layer. The first protrusions and the second protrusions may be each made of a resin material. In such a case, since lithium metal is not deposited on the tips of the first protrusions and the second protrusions, local expansion of the negative electrode can be reduced. In the negative electrode current collector, the layer, the first protrusions, and the second protrusions may be integrally made of the same material.

In each of the first surface and the second surface of the negative electrode current collector, the direction perpendicular to the winding axis of the electrode group is defined as the length direction, and the direction parallel to the winding axis is defined as the width direction. Hereinafter, the length direction in the surface of the negative electrode current collector is referred to as a first length direction, and the width direction is referred to as a first width direction. The first surface may be provided with at least one band-shaped first region where no first protrusions are formed along at least the first length direction or the first width direction. The second surface may be provided with at least one band-shaped second region where no second protrusions are formed along at least the first length direction or the first width direction. The first region and/or the second region allows a nonaqueous electrolyte to easily penetrate into the inside of the electrode group through the region. Consequently, charge/discharge reaction can be carried out in the entire electrode group, and therefore a high capacity can be easily secured.

The expression "a first region or a second region is provided along the first length direction" means that there is a band-shaped region where no first protrusions or second protrusions are formed in a direction approximately parallel to the first length direction. The expression "a first region or a second region is provided along the first width direction" means that there is a band-shaped region where no first protrusions or second protrusions are formed in a direction approximately parallel to the first width direction. In the present specification, the band-shaped region on the first surface is referred to as a first region, and the band-shaped region on the second surface is referred to as a second region.

Hereinafter, the length directions of the band-shaped first region and the band-shaped second region are each referred to as a second length direction. The above-described "direction approximately parallel to the first length direction" means that the second length direction and the first length direction are parallel to each other or that the angle on the acute angle side formed by the second length direction and the first length direction is 30° or less. The above-described "direction approximately parallel to the first width direction" means that the second length direction and the first width direction are parallel to each other or that the angle on the acute angle side formed by the second length direction and the first width direction is 30° or less.

A structure of the lithium secondary battery according to the above-described aspect will now be more specifically described with reference to the drawings as appropriate. First of all, the structure of the negative electrode will be described.

Negative Electrode

The negative electrode includes a negative electrode current collector. The negative electrode current collector includes a layer. This layer has a first surface and a second surface opposite the first surface. The negative electrode current collector further has first protrusions protruding from the first surface and second protrusions protruding from the second surface. The first surface and the second surface are the outer surface and the inner surface, respectively, of the negative electrode current collector in the wound electrode group. In the lithium secondary battery, lithium metal is deposited on the first surface and the second surface by charging. More specifically, the lithium ions contained in a nonaqueous electrolyte receive electrons on the negative electrode current collector by charging and are converted into lithium metal to be deposited on the surface of the negative electrode current collector. The lithium metal deposited on the surface of the negative electrode current collector is dissolved as lithium ions in the nonaqueous electrolyte by discharging. The lithium ions contained in the nonaqueous electrolyte may be derived from a lithium salt added to the nonaqueous electrolyte, may be supplied from the positive electrode active material by charging, or may be both.

The negative electrode current collector can secure spaces for accommodating the lithium metal deposited in the vicinities of the first surface and the second surface by having first protrusions and second protrusions. Accordingly, the spaces can reduce expansion of the negative electrode due to deposition of lithium metal. In the negative electrode current collector, the second average height of the second protrusions is set to be higher than the first average height of the first protrusions. Consequently, as described above, even if the thickness of lithium metal on the second surface is large, the change in the volume due to this increase in the thickness can be absorbed. Accordingly, increase in the apparent volume of the negative electrode can be reduced. In addition, in the wound electrode group, since a certain degree of pressure is applied to the deposited lithium metal, peeling of the lithium metal is reduced, and as a result, decrease in the charge/discharge efficiency is also reduced.

As long as the second average height is higher than the first average height, the difference between the second average height and the first average height can be adjusted according to the energy density, size, etc. of the battery. The difference between the second average height and the first average height may be 3% or more or 10% or more of the first average height. Furthermore, the difference between the second average height and the first average height may be 20% or more or 30% or more of the first average height. When the difference is within such a range, even if the thickness of the lithium metal deposited on the second surface side is large, the change in the volume of the negative electrode due to this deposition is easily absorbed. The difference between the second average height and the first average height may be, for example, 50% or less or 40% or less of the first average height. When the difference is within such a range, since a space having a volume suitable for the deposition amount of lithium is easily secured, a higher discharge capacity is easily secured while maintaining the expansion-reducing effect of the negative electrode. These lower limits and upper limits can be arbitrarily combined.

The height of each of the first protrusions and the second protrusions may be determined according to the deposition amount of lithium metal. The second average height may be 15 μm or more, 20 μm or more, or 30 μm or more. Furthermore, the second average height may be 40 μm or more or 50 μm or more. A second average height within such a range can further enhance the effect of absorbing the change in volume of the negative electrode due to deposition of lithium metal. It also can enhance the effect of protecting the electrode. The second average height may be 120 μm or less or 110 μm or less. Furthermore, the second average height may be 100 μm or less or 90 μm or less. When the second average height is within such a range, the lithium metal deposited on the second surface in the electrode group is appropriately pressed by the separator to increase the electrical conductivity between the lithium metal and the negative electrode current collector, resulting in enhancement of the charge/discharge efficiency. In addition, an excessive press of the protrusions by the separator is reduced and the electrode can be protected. These lower limits and upper limits can be arbitrarily combined.

The first average height is not particularly limited as long as it is lower than the second average height. The first average height can be determined such that the second average height and/or the difference between the second average height and the first average height is within the above-mentioned range.

At least a part of the first protrusions may be in contact with the separator. At least a part of the second protrusions may be in contact with the separator. In such cases, lithium metal is deposited by charging in the spaces formed between the negative electrode current collector and the separator. When the first protrusions and the second protrusions are in contact with the separator, the influence of the relationship between the first average height and the second average height is remarkably exhibited to enhance the effect of reducing expansion of the negative electrode. In addition, since the deposition of lithium metal is reduced at the portion, such as the tip of the protrusion, where each protrusion is in contact with the separator, local expansion of the negative electrode also can be reduced.

From the viewpoint of further enhancing the expansion-reducing effect of the negative electrode, 80% or more of the total area of projection of the first protrusions on the first surface may be in contact with the separator. From the same viewpoint, 80% or more of the total area of projection of the second protrusions on the second surface may be in contact with the separator. From the same viewpoint, all of the first protrusions and/or all of the second protrusions may be in contact with the separator.

The total area of projection of the first protrusions on the first surface is the total of the areas of projection shapes formed by projecting each of the first protrusions on the first surface in the thickness direction of the negative electrode current collector. Similarly, the total area of projection of the second protrusions on the second surface is the total of the areas of projection shapes formed by projecting each of the second protrusions on the second surface in the thickness direction of the negative electrode current collector.

The total area of projection of the first protrusions on the first surface may be 0.2% or more, 1% or more, or 3% or more of the area of the first surface. When the rate is within such a range, the separator can be easily supported by the first protrusions, and a certain distance between the first surface and the separator is easily maintained. Accordingly, the effect of reducing expansion of the negative electrode can be enhanced. The total area of projection of the first protrusions on the first surface may be 70% or less or 50% or less of the area of the first surface. When the rate is within such a range, it is easy to secure a space between the first surface and the separator. Consequently, a higher discharge capacity can be secured while reducing expansion of the negative electrode due to deposition of lithium metal. These lower limits and upper limits can be arbitrarily combined.

The rate of the total area of projection of the second protrusions on the second surface to the area of the second surface can be selected from the ranges described for the rate of the total area of projection of the first protrusions on the first surface to the area of the first surface, by the same reasons above.

The areas of the first surface and the second surface and the areas of projection of the first protrusions and the second protrusions can each be determined using the negative electrode current collector extended such that the first surface and the second surface are in a flat state. Alternatively, each area may be determined using the negative electrode current collector before production of a wound electrode group. When each area is determined using the negative electrode current collector taken out from a wound electrode group, the rates determined based on the areas calculated using a predetermined partial region of the negative electrode current collector may be used as the above-mentioned rates.

The projection shape of each of the first protrusions on the first surface and the projection shape of each of the second protrusions on the second surface are not particularly limited. From the viewpoint of easily supporting the separator and easily supplying the nonaqueous electrolyte to the vicinity of an electrode, the projection shape of each of the first protrusions on the first surface and the projection shape of each of the second protrusions on the second surface may be each, for example, a strip shape or a line shape. The projection shape of each of the first protrusions on the first surface and the projection shape of each of the second protrusions on the second surface are shapes formed by projecting the respective protrusions on the respective surfaces in the thickness direction of the negative electrode current collector.

Two adjacent first protrusions among the first protrusions on the first surface may be separated from each other to some extent from the viewpoint of securing a space having a volume suitable for accommodating deposited lithium metal. Similarly, two adjacent second protrusions among the second protrusions on the second surface may be separated from each other to some extent. For example, the minimum clearance between two adjacent first protrusions or second protrusions may be larger than the maximum width of the two adjacent first protrusions or second protrusions.

The term "minimum clearance between two adjacent first protrusions or second protrusions" refers to the minimum distance between the outer edges of the projection shapes of two adjacent protrusions arbitrarily selected from the first protrusions or the second protrusions and projected on the first surface or the second surface in the thickness direction of the negative electrode current collector. The maximum width of two adjacent protrusions is the largest value of the width in the projection shapes of the two adjacent protrusions on the first surface or the second surface. When the projection shape is a circle, the larger diameter of the projection shapes of the two protrusions is used as the maximum width.

The projection shapes of the first protrusions on the first surface may be each a strip shape or a line shape and the length directions of the first protrusions may be aligned approximately parallel to each other. Similarly, the projection shapes of the second protrusions on the second surface may be each a strip shape or a line shape and the length directions of the second protrusions may be aligned approximately parallel to each other. In such cases, the minimum clearance between two adjacent protrusions may be larger than the maximum width of the two adjacent protrusions. In such a case, the separator is easily supported by the protrusions, and a space having an appropriate volume is easily secured between two adjacent protrusions.

Hereinafter, the length direction of each of the first protrusions and the second protrusions whose projection shape is a strip shape or a line shape is referred to as a third length direction. The direction perpendicular to the third length direction is referred to as a third width direction. In this case, the maximum width of two adjacent protrusions is the largest value of the width in the third width direction in the projection shapes of the two adjacent protrusions on the first surface. That is, the maximum width of two adjacent protrusions is the larger one of the maximum width in the third width direction of one projection shape of the two protrusions and the maximum width in the third width direction of the other projection shape. The state in which the third length directions of the first protrusions or the second protrusions are aligned approximately parallel to each other refers to a case where the third length directions of the protrusions are parallel to each other or the angle on the acute angle side formed by the third length directions of the protrusions is 30° or less. The third length direction of each protrusion is the length direction of the projection shape formed by projecting the protrusion on the first surface or the second surface in the thickness direction of the negative electrode current collector.

The first surface and/or the second surface may be provided with no continuous frame-shaped protrusion surrounding the entire or a part of each surface, so that the nonaqueous electrolyte easily penetrates into the inside of the electrode group. The periphery of the first surface and/or the second surface may be provided with no continuous frame-shaped protrusion surrounding most of each surface. When the continuous frame-shaped protrusion is not formed, in the portion where no protrusion is formed, the nonaqueous electrolyte easily penetrates into the inside, and the separator easily comes into contact with the deposited lithium metal. Accordingly, since the effect of reducing uneven deposition of lithium metal is enhanced, generation of dendrites can be reduced and a decrease in the charge/discharge efficiency can be reduced.

The first surface and/or the second surface may be provided with a band-shaped region where no protrusion is formed along at least the first length direction or the first width direction. Each surface may have at least one band-shaped region and may have two or more such regions. In such a case, the nonaqueous electrolyte easily penetrates into the inside of the electrode group through the band-shaped first region and/or second region. Since the nonaqueous electrolyte can be easily maintained between the positive electrode and the negative electrode, deposition and dissolution of lithium metal smoothly progress to reduce decreases of the capacity and the charge/discharge efficiency. In addition, in the band-shaped region, the separator easily comes into contact with the deposited lithium metal. Consequently, since the effect of reducing uneven deposition of lithium metal is enhanced, generation of dendrites can be reduced.

The band-shaped region may be formed along the first length direction or the first width direction. The negative electrode current collector may have a band-shaped region along the first length direction and a band-shaped region along the first width direction on the first surface and/or the second surface. From the viewpoint of allowing the nonaqueous electrolyte to easily penetrate into the inner circumferential side of the wound electrode group and easily securing a high capacity and a high charge/discharge efficiency, the band-shaped region may be provided along the first length direction. The band-shaped region is easily formed by providing a plurality of protrusions whose projection shapes on each surface of the negative electrode current collector are a strip shape or a line shape on each surface. In particular, the band-shaped region can be easily formed between two adjacent protrusions in the first width direction by disposing a plurality of protrusions such that the second length direction of the protrusions is approximately parallel to the first length direction.

In the negative electrode current collector, as needed, a region where no first protrusions and/or second protrusions are formed may be provided on the innermost circumferential side and/or the outermost circumferential side of the winding. That is, in the negative electrode current collector, a region where no first protrusions and/or second protrusions are formed may be provided in a portion closest to the winding axis of the electrode group and/or a portion farthest from the winding axis of the electrode group. A negative electrode lead for electrically connecting the negative electrode may be connected to a portion where no protrusion is formed on the first surface or the second surface of the negative electrode current collector by, for example, welding.

FIG. 1 is a plan view schematically illustrating a negative electrode current collector used in a lithium secondary battery according to an embodiment. FIG. 1 shows one of the first surface and the second surface of the negative electrode current collector. The negative electrode current collector 134 includes metal foil (an example of the layer) 132 and a plurality of protrusions 133 protruding from the surface of the metal foil 132. A plurality of protrusions 133 shown in FIG. 1 is disposed on each of the first surface and the second surface. The projection shapes of the protrusions 133 projected on the surface of the metal foil 132 in the thickness direction of the negative electrode current collector 134 are the same as the shapes of the protrusions 133 shown in FIG. 1, i.e., a line shape. When the surface of the metal foil 132 shown in FIG. 1 is the first surface, the protrusions 133 are first protrusions. When the surface of the metal foil 132 shown in FIG. 1 is the second surface, the protrusions 133 are second protrusions. The protrusions 133 on the first surface viewed from a direction perpendicular to the first or second surface may be disposed at the same positions as those of the protrusions 133 on the second surface or may be disposed at different positions.

The negative electrode current collector 134 viewed from a direction perpendicular to the first or second surface is a rectangle in which the length in the direction perpendicular to the winding axis is longer than the length in the direction parallel to the winding axis when the electrode group is formed by winding. In FIG. 1, on the surface of the metal foil 132, the direction perpendicular to the winding axis is indicated by the first length direction LD1, and the direction parallel to the winding axis is indicated by the first width direction WD1.

In FIG. 1, the protrusions 133 are disposed on the surface of the metal foil 132 in such a manner that the third length direction LD3 of each protrusions 133 is parallel to the first length direction LD1. On the surface of the metal foil 132, a band-shaped region 132a where no protrusions 133 are formed is disposed along the first length direction LD1. The second length direction LD2 of the band-shaped region 132a is parallel to the first length direction LD1. The minimum clearance between two adjacent protrusions 133 is larger than the maximum width of the protrusions 133. When the surface of the metal foil 132 shown in FIG. 1 is the first surface, the band-shaped region 132a is the first region, and when the surface of the metal foil 132 shown in FIG. 1 is the second surface, the band-shaped region 132a is the second region.

A wound electrode group is formed using such a negative electrode current collector 134. More specifically, a negative electrode current collector 134, a separator, a positive electrode, and a separator are stacked and are wound from one end of the first length direction LD1 such that the first surface is the outer side and the second surface is the inner side to form a wound electrode group. A space is formed between the metal foil 132 and the separator between two adjacent protrusions 133 by applying this wound electrode group to a lithium secondary battery. The lithium metal deposited by charging is accommodated in this space to reduce expansion of the negative electrode.

For example, the characteristics of the negative electrode current collector, such as the projection shapes, number, directions, widths of the protrusions 133 and/or the clearance between two adjacent protrusions 133, are not limited to those shown in FIG. 1 and can be modified as described above. These characteristics may be the same or different between the first surface and the second surface.

The negative electrode current collector 134 includes an electrically conductive sheet (an example of the layer) such as the metal foil 132 and a plurality of protrusions 133 formed on each surface of the electrically conductive sheet. In the wound electrode group, the outer surface and the inner surface of the electrically conductive sheet such as the metal foil 132 are respectively the first surface and the second surface of the negative electrode current collector 134.

The electrically conductive sheet is of, for example, an electrically conductive material other than lithium metal and lithium alloys. The electrically conductive material may be a metal or a metal material such as an alloy. The metal material may be a material that does not react with lithium. Examples of such a material include materials that do not react with lithium metal and/or lithium ions. More specifically, the material may be a material that does not form an alloy and an intermetallic compound with lithium. Examples of such a metal material include copper (Cu), nickel (Ni), iron (Fe), and alloys containing these metal elements. The alloy may be, for example, a copper alloy or stainless steel (SUS). From the viewpoint of easily achieving a high capacity and a high charge/discharge efficiency by high electrical conductivity, the metal material may be copper and/or a copper alloy. The electrically conductive sheet may contain one of these electrically conductive materials or two or more of these electrically conductive materials.

As the electrically conductive sheet, for example, foil or film is used. The electrically conductive sheet may be porous provided that the winding property is not impaired. The electrically conductive sheet may be the metal foil 132 or the metal foil 132 containing copper from the viewpoint of easily securing a high electrical conductivity. Such metal foil 132 may be copper foil or copper alloy foil. The content of copper in the metal foil 132 may be 50 mass % or more or 80 mass % or more. In particular, the metal foil 132 may be copper foil containing substantially copper only as the metal element.

The thickness of the electrically conductive sheet is not particularly limited and is, for example, 5 μm or more and 20 μm or less. The protrusions 133 may be made of any material. The protrusions 133 may be each made of an electrically conductive material and/or an insulating material. The electrically conductive material can be appropriately selected from those mentioned as the material for the electrically conductive sheet. The negative electrode current collector 134 including such protrusions 133 can be prepared by, for example, forming the protrusions 133 on the surface of the electrically conductive sheet by press working or the like. Alternatively, the negative electrode current collector 134 may be formed by applying coating of the electrically conductive material or sticking tape of the electrically conductive material to the surface of the electrically conductive sheet.

The protrusions 133 may be each made of a resin material. The resin material may be insulative. Deposition of lithium metal by charging on the tips of the protrusions 133 can be reduced by forming the protrusions 133 from an insulating material such as a resin material. The deposited lithium metal is accommodated in the negative electrode current collector 134, more specifically, in the space formed in the vicinity of the surface of the electrically conductive sheet such as metal foil 132. Accordingly, the effect of reducing expansion of the negative electrode can be enhanced.

The resin material is, for example, at least one selected from the group consisting of an olefin resin, an acrylic resin, a polyamide resin, a polyimide resins, and a silicone resin. The resin material may be a cured product of a curable resins, such as an epoxy resin. The protrusions 133 are made of, for example, adhesive tape of a resin. The protrusions 133 can be formed on the metal foil 132 by sticking the adhesive tape on the surface of the metal foil 132. Alternatively, the protrusions 133 may be formed by applying a solution or dispersion containing a resin material onto the surface of the metal foil 132 and drying it. The protrusions 133 also can be formed by applying a curable resin on the surface of the metal foil 132 into a desirable shape and curing it.

On the surface of the metal foil 132, a negative electrode mixture layer (not shown) may be formed. In such a case, the metal foil 132 and the negative electrode mixture layer correspond to the layer of the present disclosure. The negative electrode mixture layer may contain lithium metal. The negative electrode mixture layer may be formed on the entire surface. The negative electrode mixture layer is formed by, for example, electrodeposition or vapor deposition of lithium metal on a part or the whole of the surface. Alternatively, the negative electrode mixture layer is formed by applying paste containing a negative electrode active material, such as graphite, onto a part or the whole of the surface. The negative electrode mixture layer and the protrusions 133 may be formed in any order. The protrusions 133 may be formed after formation of the negative electrode mixture layer, or the negative electrode mixture layer may be formed after formation of the protrusions 133. However, they are formed such that the negative electrode mixture material does not cover the entire surfaces of the protrusions 133. The thickness of the negative electrode mixture layer is not particularly limited and is, for example, 30 to 300 μm.

Lithium Secondary Battery

A structure of the lithium secondary battery will now be more specifically described.

The lithium secondary battery includes a wound electrode group and a nonaqueous electrolyte. The wound electrode group is formed by winding a positive electrode, a negative electrode, and a separator between these electrodes.

Figure 2:
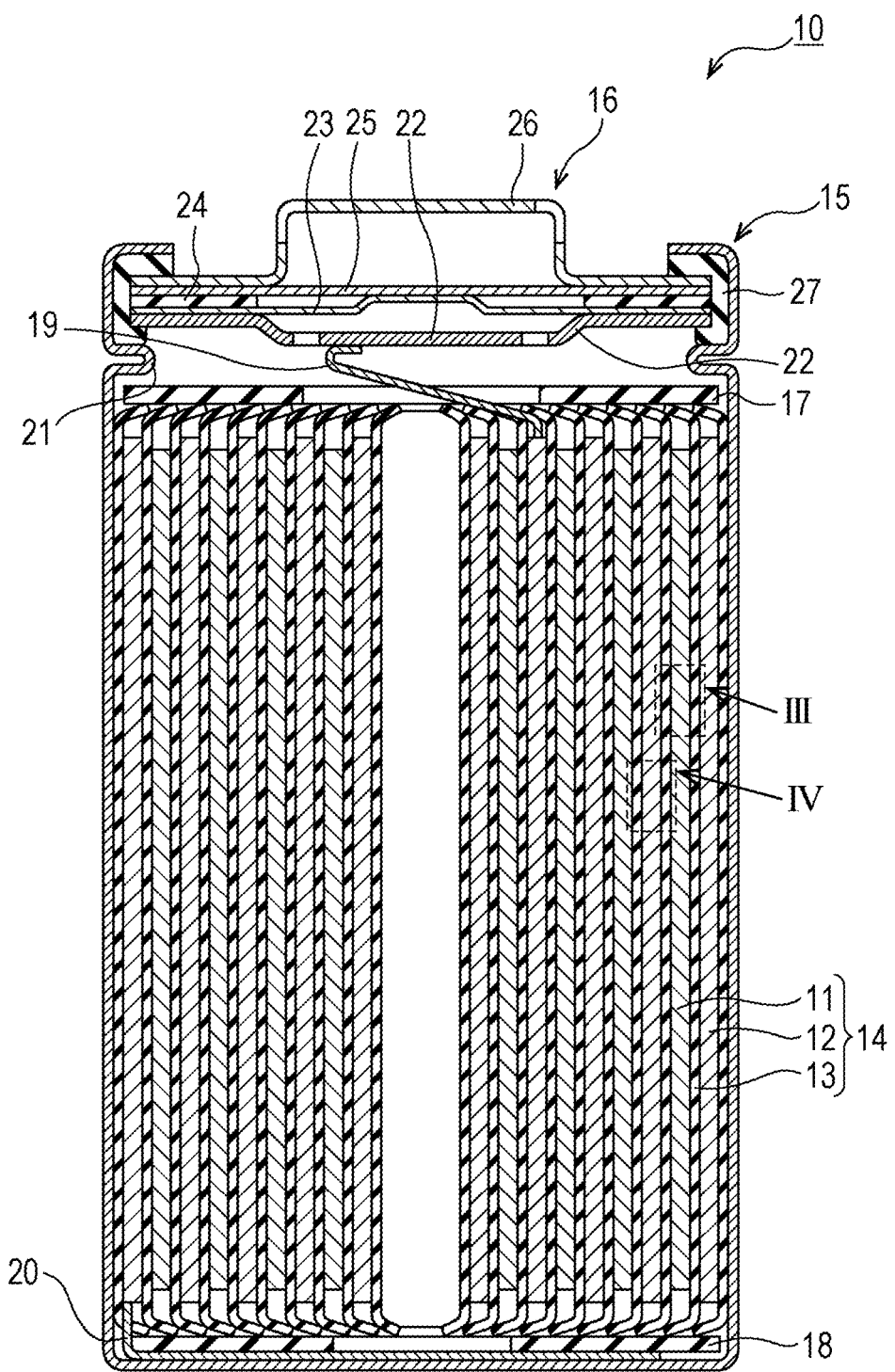
FIG. 2 is a longitudinal cross-sectional view schematically illustrating a lithium secondary battery according to another embodiment of the present disclosure.
Figure 3:
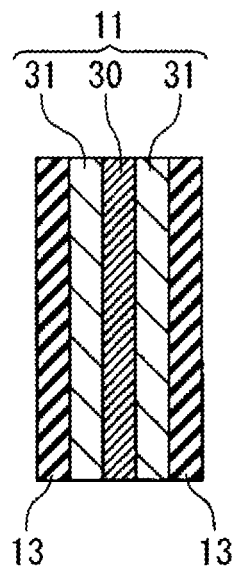
FIG. 3 is an enlarged cross-sectional view schematically illustrating the region indicated by III in FIG. 2.
Figure 4:
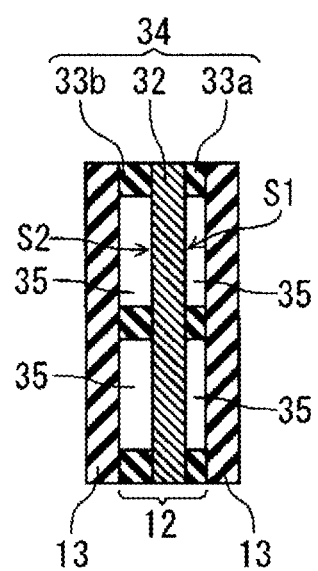
FIG. 4 is an enlarged cross-sectional view schematically illustrating the region indicated by IV in FIG. 2.

FIG. 2 is a longitudinal cross-sectional view schematically illustrating a lithium secondary battery according to an embodiment of the present disclosure. FIG. 3 is an enlarged cross-sectional view schematically illustrating the region indicated by III in FIG. 2. FIG. 4 is an enlarged cross-sectional view schematically illustrating the region indicated by IV in FIG. 2.

The lithium secondary battery 10 is a cylindrical battery including a cylindrical battery case, a wound electrode group 14 accommodated in the battery case, and a nonaqueous electrolyte (not shown). The battery case is composed of a case body 15 which is a bottomed cylindrical metal container and a sealing body 16 which seals the opening of the case body 15. A gasket 27 is disposed between the case body 15 and the sealing body 16 and secures sealability of the battery case. In the case body 15, insulating plates 17, 18 are respectively disposed at both ends of the electrode group 14 in the winding axis.

The case body 15 has, for example, a stepped portion 21 formed by partially pressing the side wall of the case body 15 from the outside. The stepped portion 21 may be annularly formed on the side wall of the case body 15 along the circumferential direction of the case body 15. In such a case, the sealing body 16 is supported by the surface of the stepped portion 21 on the opening side.

The sealing body 16 includes a filter 22, a lower valve 23, an insulating member 24, an upper valve 25, and a cap 26. In the sealing body 16, these members are stacked in this order. The sealing body 16 is set to the opening of the case body 15 such that the cap 26 is positioned outside the case body 15 and the filter 22 is positioned inside the case body 15. Each member constituting the sealing body 16 has, for example, a disk shape or a ring shape. The members excluding the insulating member 24 are electrically connected to each other.

The electrode group 14 includes a positive electrode 11, a negative electrode 12, and a separator 13. The positive electrode 11, the negative electrode 12, and the separator 13 all have band-like shapes. The positive electrode 11 and the negative electrode 12 are spirally wound with the separator 13 between these electrodes such that the width direction of the band-shaped positive electrode 11 and negative electrode 12 is parallel to the winding axis. In a cross section perpendicular to the winding axis of the electrode group 14, the positive electrode 11 and the negative electrode 12 are alternately laminated in the radius direction of the electrode group 14 with the separator 13 between these electrodes.

The positive electrode 11 is electrically connected to a cap 26, which also serves as a positive electrode terminal, via a positive electrode lead 19. One end of the positive electrode lead 19 is connected to, for example, the vicinity of the center in the length direction of the positive electrode 11. The positive electrode lead 19 extending from the positive electrode 11 passes through a through hole (not shown) formed in the insulating plate 17 and reaches the filter 22. The other end of the positive electrode lead 19 is welded to the surface of the filter 22 on the electrode group 14 side.

The negative electrode 12 is electrically connected to the case body 15, which also serves as a negative electrode terminal, via a negative electrode lead 20. One end of the negative electrode lead 20 is connected to, for example, an end of the negative electrode 12 in the length direction, and the other end is welded to the inner surface of the bottom of the case body 15.

FIG. 3 shows the positive electrode 11 facing the separator 13. FIG. 4 shows the negative electrode 12 facing the separator 13. The positive electrode 11 includes a positive electrode current collector 30 and positive electrode mixture layers 31 disposed on both surfaces of the positive electrode current collector 30. The negative electrode 12 includes a negative electrode current collector 34. The negative electrode current collector 34 may be the negative electrode current collector 134 that is described above. In the electrode group 14, the negative electrode current collector 34 includes first protrusions 33a on the first surface S1 that is the outer side of the negative electrode current collector 34 and includes second protrusions 33b on the second surface S2 that is the inner side of the negative electrode current collector 34. The first surface S1 and the second surface S2 of the negative electrode current collector 34 are the first surface and the second surface, respectively, of the electrically conductive sheet, such as metal foil 32, included in the negative electrode current collector 34. The first protrusions 33a protrude from the first surface S1 toward the surface of the separator 13 facing the first surface S1. The second protrusions 33b protrude from the second surface S2 toward the surface of the separator 13 facing the second surface S2.

The first protrusions 33a and the second protrusions 33b are formed on the first surface S1 and the second surface S2, respectively. A space 35 is formed between the first surface S1 and the separator 13 between adjacent first protrusions 33a. In addition, a space 35 is formed between the second surface S2 and the separator 13 between adjacent second protrusions 33b. In the lithium secondary battery 10, lithium metal is deposited in the space 35 by charging, and the deposited lithium metal is dissolved in the nonaqueous electrolyte by discharging. Since the space 35 can accommodate the deposited lithium metal, the change in the apparent volume of the negative electrode 12 by deposition of lithium metal can be decreased. In addition, the change in the volume by deposition of lithium metal can be absorbed by previously adjusting the second average height on the second surface S2 side, where the thickness of deposited lithium metal is larger than that on the first surface S1, to be higher than the first average height. Accordingly, expansion of the negative electrode can be reduced. In the electrode group 14, since a pressure is also applied to the lithium metal accommodated in the space 35, peeling of the lithium metal is reduced. Accordingly, the decrease of the charge/discharge efficiency also can be reduced.

As the negative electrode 12 and the negative electrode current collector 34, the negative electrode and the negative electrode current collector 134 described above can be used. Accordingly, regarding the negative electrode 12 and the negative electrode current collector 34, the explanation of the negative electrode and the negative electrode current collector 134 described above can be referred to. The structure other than the negative electrode 12 of the lithium secondary battery will now be described more specifically.

Positive Electrode 11

The positive electrode 11 includes, for example, a positive electrode current collector 30 and a positive electrode mixture layer 31 formed on the positive electrode current collector 30. The positive electrode mixture layer 31 may be formed on both surfaces of the positive electrode current collector 30. The positive electrode mixture layer 31 may be formed one of the surfaces of the positive electrode current collector 30. For example, in the region connected to the positive electrode lead 19 and/or the region not facing the negative electrode 12, the positive electrode mixture layer 31 may be formed on only one surface of the positive electrode current collector 30. For example, since a region not facing the negative electrode 12 is present in a region positioned on the innermost circumference of the winding and in the vicinity thereof and/or a region positioned on the outermost circumference of the winding and in the vicinity thereof, in such regions, the positive electrode mixture layer 31 may be formed on only one surface of the positive electrode current collector 30, or no positive electrode mixture layer 31 may be formed on both surfaces.

The positive electrode mixture layer 31 contains a positive electrode active material and can contain a conductive material and/or a binder as optional components. The positive electrode mixture layer 31 may contain an additive as needed. An electrically conductive carbon material may be disposed between the positive electrode current collector 30 and the positive electrode mixture layer 31 as needed. The positive electrode 11 is prepared by, for example, applying a slurry containing structural components of the positive electrode mixture layer and a dispersion medium to the surface of the positive electrode current collector 30, and drying and then rolling the resulting coating film. An electrically conductive carbon material may be applied onto the surface of the positive electrode current collector 30 as needed. The dispersion medium is, for example, water and/or an organic medium.

The positive electrode active material is, for example, a material that occludes and releases lithium ions. The positive electrode active material is, for example, at least one selected from the group consisting of a lithium-containing transition metal oxide, a transition metal fluoride, a polyanion, a fluorinated polyanion, and a transition metal sulfide. The positive electrode active material may be a lithium-containing transition metal oxide from the viewpoint of a high average discharge voltage and a cost advantage.

Examples of the transition metal element contained in the lithium-containing transition metal oxide include Sc, Ti, V, Cr, Mn, Fe, Co, Ni, Cu, Y, Zr, and W. The lithium-containing transition metal oxide may contain a single transition metal element or two or more transition metal elements. The transition metal element may be at least one selected from the group consisting of Co, Ni, and Mn. The lithium-containing transition metal oxide can contain one or more typical metal elements as needed. Examples of the typical metal element include Mg, Al, Ca, Zn, Ga, Ge, Sn, Sb, Pb, and Bi. The typical metal element may be, for example, Al.

The conductive material is, for example, a carbon material. Examples of the carbon material include carbon black, carbon nanotubes, and graphite. Examples of the carbon black include acetylene black and Ketjen black. The positive electrode mixture layer 31 may include one or more conductive materials. At least one material selected from these carbon materials may be used as the electrically conductive carbon material to be disposed between the positive electrode current collector 30 and the positive electrode mixture layer 31.

Examples of the binder include fluororesins, polyacrylonitrile, polyimide resins, acrylic resins, polyolefin resins, and rubber-like polymers. Examples of the fluororesin include polytetrafluoroethylene and polyfluorinated vinylidene. The positive electrode mixture layer 31 may contain a single binder or two or more binders.

Examples of the material of the positive electrode current collector 30 include metal materials containing Al, Ti, Fe, and so on. The metal material may be, for example, Al, an Al alloy, Ti, a Ti alloy, or a Fe alloy. The Fe alloy may be SUS. Examples of the positive electrode current collector 30 include foil and film. The positive electrode current collector 30 may be porous. For example, metal mesh may be used as the positive electrode current collector 30.

Separator 13

As the separator 13, a porous sheet having ionic permeability and insulation is used. Examples of the porous sheet include microporous film, woven fabric, and nonwoven fabric. The material of the separator is not particularly limited and may be a polymer material. Examples of the polymer material include olefin resins, polyamide resins, and cellulose. Examples of the olefin resin include polyethylene, polypropylene, and copolymers of ethylene and propylene. The separator 13 may contain an additive as needed. Examples of the additive include inorganic fillers.

The separator 13 may include a plurality of layers having different forms and/or compositions. Such separator 13 may be, for example, a layered product of a polyethylene microporous film and and a polypropylene microporous film or a layered product of a nonwoven fabric containing cellulose fibers and a nonwoven fabric containing a thermoplastic resin fibers. Alternatively, the separator 13 may be formed by applying a polyamide resin to the surface of, for example, microporous film, woven fabric, or nonwoven fabric to form a coating film. Such separator 13 has high durability even in a state where a pressure is applied to the separator 13 being in contact with a plurality of protrusions. In addition, from the viewpoint of securing heat resistance and/or strength, the separator 13 may include a layer containing an inorganic filler on the side facing the positive electrode 11 and/or the side facing the negative electrode 12.

Nonaqueous Electrolyte

The nonaqueous electrolyte to be used has lithium-ion conductivity. Such a nonaqueous electrolyte includes a nonaqueous solvent and lithium ions and anions dissolved in the nonaqueous solvent. The nonaqueous electrolyte may be in a liquid form or may be in a gel form. A liquid nonaqueous electrolyte is prepared by dissolving a lithium salt in a nonaqueous solvent. Lithium ions and anions are generated by that the lithium salt is dissolved in the nonaqueous solvent. The nonaqueous electrolyte may contain an undissociated lithium salt. As the lithium salt, a salt of a lithium ion and an anion is used.

The nonaqueous electrolyte in a gel form include a liquid nonaqueous electrolyte and a matrix polymer. The matrix polymer to be used is, for example, a polymer material that absorbs a nonaqueous solvent and thereby gels. As such a polymer material, for example, at least one selected from the group consisting of a fluororesin, an acrylic resin, and a polyether resin is used.

As the lithium salt and the anion, known lithium salts and anions that are used for nonaqueous electrolytes of lithium secondary batteries can be used. Examples of the anion include $BF_4^-$, $ClO_4^-$, $PF_6^-$, $CF_3SO_3^-$, $CF_3CO_2^-$, anions of imides, and anions of oxalate complexes. Examples of the anion of an imide include $N(SO_2CF_3)_2^-$ and $N(C_mF_{2m+1}SO_2)_x(C_nF_{2n+1}SO_2)y^-$ (where m and n are each independently an integer of 0 or 1 or more; and x and y are each independently 0, 1, or 2 and satisfy x+y=2). The anion of an oxalate complex may contain boron and/or phosphorus. Examples of the anion of an oxalate complex include bis(oxalate)borate anions, $BF_2(C_2O_4)^-$, $PF_4(C_2O_4)^-$, and $PF_2(C_2O_4)_2^-$. The nonaqueous electrolyte may include a single type or two or more types of these anions.

The nonaqueous electrolyte may include at least one selected from the group consisting of $PF_6^-$, anions of imides, and anions of oxalate complexes from the viewpoint of reducing deposition of lithium metal in a dendrite form. The anion of an imide may be $N(SO_2CF_3)_2^-$, $N(SO_2C_2F_5)_2^-$, or $N(SO_2F)_2^-$. In particular, the use of a nonaqueous electrolyte containing anions of an oxalate complex allows lithium metal in a form of fine particles to easily deposit evenly by interaction between the anions of the oxalate complex and lithium. Accordingly, it is possible to reduce uneven expansion of the negative electrode due to local deposition of lithium metal. A combination of anions of an oxalate complex and other anions may be used. Such other anions may be $PF_6^-$ and/or anions of imides.

Examples of the nonaqueous solvent include esters, ethers, nitriles, amides, and halogen-substituted products thereof. The nonaqueous electrolyte may include one of these nonaqueous solvents or two or more of these nonaqueous solvents. Examples of the halogen-substituted product include fluorides.

Examples of the ester include carbonates and carboxylates. Examples of cyclic carbonate include ethylene carbonate, propylene carbonate, and fluoroethylene carbonate (FEC). Examples of chain carbonate include dimethyl carbonate, ethyl methyl carbonate, and diethyl carbonate. Examples of cyclic carboxylate include γ-butyrolactone and γ-valerolactone. Examples of chain carboxylate include ethyl acetate, methyl propionate, and methyl fluoropropionate.

Examples of the ether include cyclic ethers and chain ethers. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The concentration of the lithium salt in the nonaqueous electrolyte is, for example, 0.5 mol/L or more and 3.5 mol/L or less. In the present specification, the concentration of a lithium salt is the sum of the concentration of dissociated lithium salt and the concentration of undissociated lithium salt. The concentration of anions in the nonaqueous electrolyte may be 0.5 mol/L or more and 3.5 mol/L or less.

The additive may form a coating film on the negative electrode. Generation of dendrites is easily reduced by forming the coating film derived from the additive on the negative electrode. Examples of the additive include vinylene carbonate, FEC, and vinyl ethylene carbonate (VEC). These additives may be used alone or in combination of two or more thereof.

Others

In the examples shown in the drawings, although a cylindrical lithium secondary battery has been described, the battery is not limited thereto, and the present embodiment can also be applied to a lithium secondary battery including a wound electrode group having an oval or elliptical shape as the end face shape of the wound electrode group in the winding axis direction. As the structures other than the electrode group and the nonaqueous electrolyte of the lithium secondary battery, known structures can be used without specific limitations.

EXAMPLES

The lithium secondary battery according to the present disclosure will now be specifically described based on Examples and Comparative Examples. The present disclosure is not limited to the following Examples.

Example 1

(1) Production of Positive Electrode

A positive electrode active material, acetylene black as a conductive material, and polyfluorinated vinylidene as a binder were mixed at a mass ratio of 95:2.5:2.5. An appropriate amount of N-methyl-2-pyrrolidone as a dispersion medium was added to the mixture, followed by stirring to prepared a positive electrode mixture slurry. The positive electrode active material used was a lithium-containing transition metal oxide containing Ni, Co, and Al.

The positive electrode mixture slurry was applied to both surfaces of aluminum foil as a positive electrode current collector and was then dried. The dried product was compressed in the thickness direction with a roller. The resulting layered product was cut into a predetermined electrode size to produce a positive electrode provided with positive electrode mixture layers on both surfaces of the positive electrode current collector. An exposed portion of the positive electrode current collector not provided with the positive electrode mixture layer was formed in a partial region of the positive electrode. One end of an aluminum positive electrode lead was attached to the exposed portion of the positive electrode current collector by welding.

(2) Production of Negative Electrode Current Collector

A negative electrode current collector 134 provided with a plurality of protrusions 133 on both surfaces as shown in FIG. 1 was produced. More specifically, an electrolytic copper foil having a thickness of 10 µm was used as metal foil 132, and a polyethylene adhesive tape having a thickness of 50 µm was stuck to one surface of the metal foil 132, and a polyethylene adhesive tape having a thickness of 35 µm was stuck to the other surface to form a plurality of line-shaped protrusions 133 on each surface. The protrusions 133 formed on one surface of the metal foil 132 had an average height of 50 µm, and the protrusions 133 formed on the other surface had an average height of 35 µm. The resulting product was cut into a predetermined electrode size to form a negative electrode current collector 134 provided with three line-shaped protrusions 133 as shown in FIG. 1 on each surface. One end of a nickel negative electrode lead was attached to the negative electrode current collector 134 by welding.

Each of the protrusions formed of the adhesive tape on each surface of the negative electrode current collector 134 had a width of 1 mm, and the minimum clearance between two adjacent protrusions was 5 mm. The total area of projection of the protrusions on each surface of the negative electrode current collector 134 was 16.7% of the area of the surface. Almost 100% of the upper surfaces of the protrusions (the upper surface of the adhesive tape) were in contact with the separator.

(3) Preparation of Nonaqueous Electrolyte

Ethylene carbonate and dimethyl carbonate were mixed at a volume ratio of 3:7. $LiPF_6$ and $LiBF_2(C_2O_4)_2$ were dissolved in the resulting solvent mixture at concentrations of 1 mol/L and 0.1 mol/L, respectively, to prepare a liquid nonaqueous electrolyte.

(4) Production of Battery

The positive electrode prepared in the above-described (1) and the negative electrode current collector 134 prepared in the above-described (2) were stacked with a polyethylene microporous film as a separator therebetween in an inert gas atmosphere. More specifically, the positive electrode, the separator, the negative electrode current collector 134, and the separator were stacked in this order separator. The resulting layered product was spirally wound to produce an electrode group. The layered product was wound such that the protrusions having an average height of 35 µm of the negative electrode current collector 134 were on the outer side and the protrusions having an average height of 50 µm were on the inner side. In the resulting wound electrode group, first protrusions having a first average height of 35 µm were disposed on the first surface on the outer side of the negative electrode current collector 134, and second protrusions having a second average height of 50 µm were disposed on the second surface on the inner side. The electrode group was accommodated in a bag-like exterior body formed by a laminate sheet including an Al layer, the nonaqueous electrolyte was poured in the exterior body, and the exterior body was then sealed. A lithium secondary battery was thus produced.

Example 2

A lithium secondary battery was produced as in Example 1 except the followings. In the production of the negative electrode current collector 134, a polyethylene adhesive tape having a thickness of 60 µm was used instead of the adhesive tape having a thickness of 35 µm. In the production of the wound electrode group, the layered product was wound such that the protrusions having an average height of 50 µm of the negative electrode current collector 134 were on the outer side and the protrusions having an average height of 60 µm were on the inner side. In the resulting wound electrode group, first protrusions having a first average height of 50 µm were disposed on the first surface on the outer side of the negative electrode current collector 134, and second protrusions having a second average height of 60 µm were disposed on the second surface on the inner side.

Example 3

A lithium secondary battery was produced as in Example 1 except the followings. In the production of the negative electrode current collector 134, a polyethylene adhesive tape having a thickness of 75 µm was used instead of the adhesive tape having a thickness of 35 µm. In the production of the wound electrode group, the layered product was wound such that the protrusions having an average height of 50 µm of the negative electrode current collector 134 were on the outer side and the protrusions having an average height of 75 µm were on the inner side. In the resulting wound electrode group, first protrusions having a first average height of 50 µm were disposed on the first surface on the outer side of the negative electrode current collector 134, and second protrusions having a second average height of 75 µm were disposed on the second surface on the inner side.

Example 4

A lithium secondary battery was produced as in Example 1 except the followings. In the production of the negative electrode current collector 134, a polyethylene adhesive tape having a thickness of 30 µm was used instead of the adhesive tape having a thickness of 50 µm. In the production of the wound electrode group, the layered product was wound such that the protrusions having an average height of 30 µm of the negative electrode current collector 134 were on the outer side and the protrusions having an average height of 35 µm were on the inner side. In the resulting wound electrode group, first protrusions having a first average height of 30 µm were disposed on the first surface on the outer side of the negative electrode current collector 134, and second protrusions having a second average height of 35 µm were disposed on the second surface on the inner side.

Comparative Example 1

A wound electrode group and a lithium secondary battery were produced as in Example 1 except the followings. In the production of the negative electrode current collector 134, a plurality of protrusions 133 were formed using an adhesive tape having a thickness of 35 µm on both surfaces of an electrically conductive copper foil. In the resulting wound electrode group, first protrusions having a first average height of 35 µm were disposed on the first surface on the outer side of the negative electrode current collector 134, and second protrusions having a second average height of 35 µm were disposed on the second surface on the inner side.

Comparative Example 2

A wound electrode group and a lithium secondary battery were produced as in Example 1 except the followings. In the production of the negative electrode current collector 134, a plurality of protrusions 133 were formed using an adhesive tape having a thickness of 50 µm on both surfaces of an electrically conductive copper foil. In the resulting wound electrode group, first protrusions having a first average height of 50 µm were disposed on the first surface on the outer side of the negative electrode current collector 134, and second protrusions having a second average height of 50 µm were disposed on the second surface on the inner side.

Comparative Example 3

A lithium secondary battery was produced as in Example 1 except the followings. In the production of the wound electrode group, the layered product was wound such that the protrusions having an average height of 50 µm of the negative electrode current collector 134 were on the outer side and the protrusions having an average height of 35 µm were on the inner side. In the resulting wound electrode group, first protrusions having a first average height of 50 µm were disposed on the first surface on the outer side of the negative electrode current collector 134, and second protrusions having a second average height of 35 µm were disposed on the second surface on the inner side.

Comparative Example 4

A lithium secondary battery was produced as in Example 1 except the followings. The negative electrode current collector 134 used in Example 2 was used. In the production of the wound electrode group, the layered product was wound such that the protrusions having an average height of 60 µm of the negative electrode current collector 134 were on the outer side and the protrusions having an average height of 50 µm were on the inner side. In the resulting wound electrode group, first protrusions having a first average height of 60 µm were disposed on the first surface on the outer side of the negative electrode current collector 134, and second protrusions having a second average height of 50 µm were disposed on the second surface on the inner side.

Comparative Example 5

A lithium secondary battery was produced as in Example 1 except the followings. The negative electrode current collector 134 used in Example 3 was used. In the production of the wound electrode group, the layered product was wound such that the protrusions having an average height of 75 µm of the negative electrode current collector 134 were on the outer side and the protrusions having an average height of 50 µm were on the inner side. In the resulting wound electrode group, first protrusions having a first average height of 75 µm were disposed on the first surface on the outer side of the negative electrode current collector 134, and second protrusions having a second average height of 50 µm were disposed on the second surface on the inner side.

Evaluation

The lithium secondary batteries prepared in Examples and Comparative Examples were subjected to a charge/discharge test using the following procedure to assess the rate of expansion of each negative electrode. The lithium secondary batteries were each charged in a thermostatic chamber of 25° C. by the following conditions, the charging was then paused for 20 minutes, and the batteries were discharged by the following conditions.

Charging

Constant-current charging was performed with a current of 10 mA per unit area (unit: square centimeter) of the electrode until the battery voltage reached 4.3 V, and constant-voltage discharging was then performed with a voltage of 4.3 V until the current value per unit area (unit: square centimeter) of the electrode reached 1 mA.

Discharging

Constant-current discharging was performed with a current of 10 mA per unit area (unit: square centimeter) of the electrode until the battery voltage reached 2.5 V. The above charging and discharging was defined as one cycle, and after charging of the second cycle, the batteries were each disassembled to take out the negative electrode. The negative electrode was cleaned with dimethyl carbonate and was dried, and the thickness of the negative electrode was then measured. The thickness of the negative electrode was determined by averaging the thicknesses measured at arbitrary five points in the negative electrode with a peacock digital thickness gauge G2-205M. The thickness of the current collector of the negative electrode before the charge and discharge was defined as 100%, and the rate (%) of the thickness of the negative electrode after the second cycle to the thickness of the current collector was defined as the negative electrode expansion rate.

The results of Examples and Comparative Examples are shown in Table 1. Table 1 collectively shows the first average height of first protrusions and the second average height of second protrusions. A1 to A4 indicate Examples 1 to 4, respectively, and B1 to B5 indicate Comparative Examples 1 to 5, respectively.

TABLE 1

| | Second average height (μm) | First average height (μm) | Negative electrode expansion rate (%) |
|---|---|---|---|
| A1 | 50 | 35 | 110 |
| A2 | 60 | 50 | 105 |
| A3 | 75 | 50 | 102 |
| A4 | 35 | 30 | 118 |
| B1 | 35 | 35 | 138 |
| B2 | 50 | 50 | 138 |
| B3 | 35 | 50 | 142 |
| B4 | 50 | 60 | 126 |
| B5 | 50 | 75 | 122 |

As shown in Table 1, in the batteries of Examples Al to A4, compared to the batteries of Comparative Examples B1 to B5, the rates of expansion of the negative electrodes were low. The difference between Examples and Comparative Examples is only the relationship between the first average height of first protrusions on the first surface on the outer side of the negative electrode current collector 134 and the second average height of second protrusions on the second surface on the inner side in the wound electrode group. In these batteries, a slight difference in the first average height and/or the second average height causes a significant difference in the negative electrode expansion rate between Comparative Examples and Examples.

More specifically, when the first average height and the second average height were the same, the negative electrode expansion rate was 138%, and when the second average height was smaller than the first average height, the negative electrode expansion rate was 122% to 142%, thus the negative electrode expansion rates were high. In contrast to these results, in Examples, where the second average height was larger than the first average height, the negative electrode expansion rate was decreased to 118% or less. In particular, in Examples Al to A3, a significantly low negative electrode expansion rates, 102% to 110%, were obtained. It is conceived that in Examples, even if the thickness of lithium metal is increased, this increase can be absorbed by providing second protrusions having a large height on the second surface side, and the expansion of the negative electrode is thereby reduced.

Figure 5:
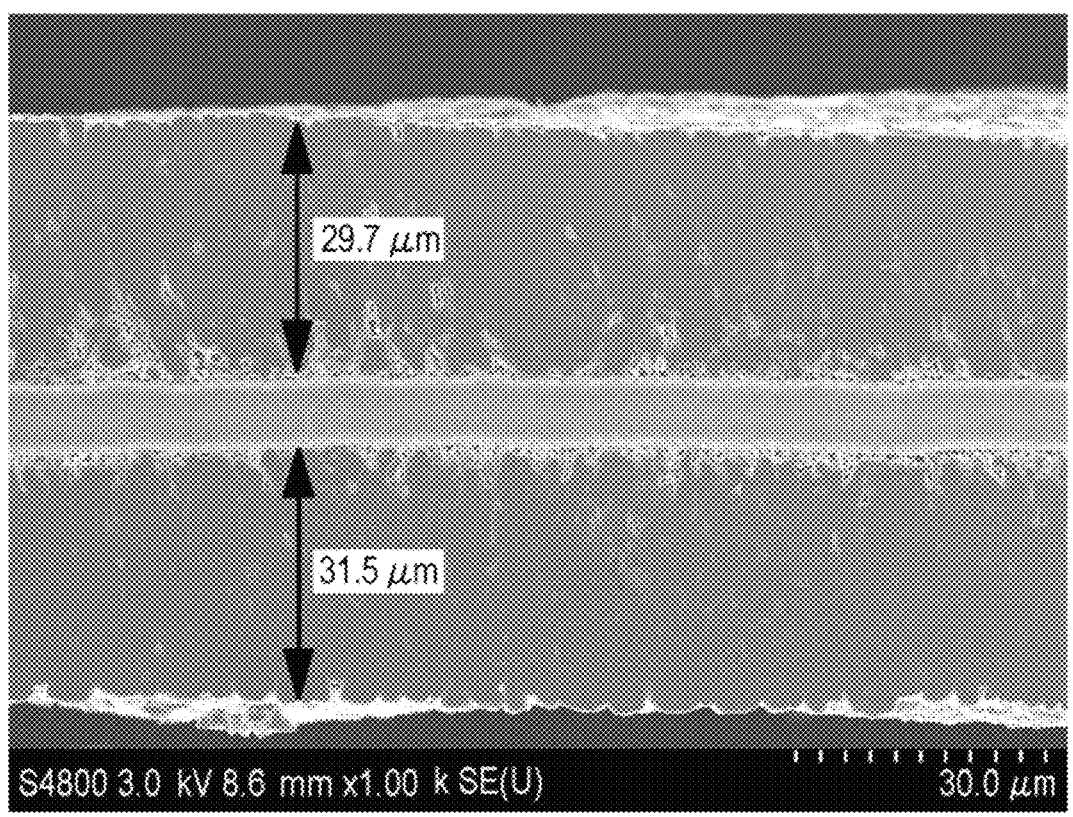
FIG. 5 is a scanning electron micrograph of a part of the negative electrode in the lithium secondary battery of Example 1.

FIG. 5 is a scanning electron micrograph of a part of the negative electrode in the lithium secondary battery of Example 1. FIG. 5 shows the state of the negative electrode of the lithium secondary battery of Example 1 after charging in the second cycle of the charge/discharge test. The thicknesses of lithium metal deposited on the second surface and the first surface of the negative electrode current collector measured from FIG. 5 were 31.5 μm and 29.7 μm, respectively, in the vicinity of the center of two adjacent protrusions. Thus, in the wound electrode group, the thickness of the lithium metal deposited on the second surface on the inner side was larger than that of the first surface on the outer side. However, in Examples, even if a difference occurred between the first surface side and the second surface side in the thickness of lithium metal, the change in the volume due to deposition of lithium metal can be effectively absorbed by forming first protrusions and second protrusions having the above-described relationship in their average heights. It is conceived that, as a result, it was possible to reduce the expansion of the negative electrode.

In the lithium secondary battery according to the present disclosure, since the expansion of the negative electrode can be reduced, a high discharge capacity is easily achieved. Accordingly, the lithium secondary battery according to the present disclosure is useful for various applications, for example, electronic devices, such as mobile phones, smart phones, and tablet terminals; electric vehicles including hybrids and plug-in hybrids; and household storage batteries combined with solar batteries.

What is claimed is:

1. A lithium secondary battery comprising:
    a wound electrode group including a positive electrode, a negative electrode, and a separator between the positive electrode and the negative electrode; and
    a lithium-ion conductive nonaqueous electrolyte, wherein:
    the negative electrode includes a negative electrode current collector,
    the negative electrode current collector includes: a layer having a first surface facing outward of the winding of the electrode group and a second surface facing inward of the winding of the electrode group, first protrusions protruding from the first surface, and second protrusions protruding from the second surface,
    lithium metal is deposited on the first surface and the second surface by charging,
    the first protrusions and the second protrusions are each made of a resin material, and
    a second average height of the second protrusions in a thickness direction of the negative electrode current collector is higher than a first average height of the first protrusions in the thickness direction of the negative electrode current collector.

2. The lithium secondary battery according to claim 1, wherein a difference between the second average height and the first average height is 3% or more and 50% or less of the first average height.

3. The lithium secondary battery according to claim 1, wherein the layer includes copper foil or copper alloy foil.

4. The lithium secondary battery according to claim 1, wherein:
    the first protrusions and the second protrusions are each in contact with the separator, and
    the lithium metal is deposited in a space between the negative electrode current collector and the separator by charging.

5. The lithium secondary battery according to claim 1, wherein:
    the first protrusions are made of a material different from that of the layer, and
    the second protrusions are made of a material different from that of the layer.

6. The lithium secondary battery according to claim 1, wherein:
    a projection shape of each of the first protrusions on the first surface is a strip shape or a line shape,
    a projection shape of each of the second protrusions on the second surface is a strip shape or a line shape,
    in the first surface, a minimum clearance between two adjacent first protrusions among the first protrusions is larger than a maximum width of the two adjacent first protrusions, and
    in the second surface, a minimum clearance between two adjacent second protrusions among the second protrusions is larger than a maximum width of the two adjacent second protrusions.

7. The lithium secondary battery according to claim 1, wherein:
    a total area of projection of the first protrusions on the first surface is 0.2% or more and 70% or less of the area of the first surface and a total area of projection of the second protrusions on the second surface is 0.2% or more and 70% or less of the area of the second surface.

8. The lithium secondary battery according to claim 1, wherein the second average height is 15 µm or more and 120 µm or less.

9. The lithium secondary battery according to claim 1, wherein
in each of the first surface and the second surface of the layer, when a direction perpendicular to the winding axis of the electrode group is defined as a length direction, and a direction parallel to the winding axis is defined as a width direction,
at least one band-shaped first region where no first protrusions are formed is disposed on the first surface along at least the length direction or the width direction, and
at least one band-shaped second region where no second protrusions are formed is disposed on the second surface along at least the length direction or the width direction.

10. The lithium secondary battery according to claim 1, wherein:
the nonaqueous electrolyte includes a lithium ion and an anion, and
the anion includes at least one selected from the group consisting of $PF_6^-$, anions of imides, and anions of oxalate complexes.

11. A lithium secondary battery comprising:
a wound electrode group including a positive electrode, a negative electrode, and a separator between the positive electrode and the negative electrode; and
a lithium-ion conductive nonaqueous electrolyte, wherein:
the negative electrode includes a negative electrode current collector,
the negative electrode current collector includes: a layer having a first surface facing outward of the winding of the electrode group and a second surface facing inward of the winding of the electrode group, first protrusions protruding from the first surface, and second protrusions protruding from the second surface,
lithium metal is deposited on the first surface and the second surface by charging,
the layer, the first protrusions, and the second protrusions are integrally formed of the same material, and
a second average height of the second protrusions in a thickness direction of the negative electrode current collector is higher than a first average height of the first protrusions in the thickness direction of the negative electrode current collector.

12. The lithium secondary battery according to claim 11, wherein a difference between the second average height and the first average height is 3% or more and 50% or less of the first average height.

13. The lithium secondary battery according to claim 11, wherein the layer includes copper foil or copper alloy foil.

14. The lithium secondary battery according to claim 11, wherein:
the first protrusions and the second protrusions are each in contact with the separator, and
the lithium metal is deposited in a space between the negative electrode current collector and the separator by charging.

15. The lithium secondary battery according to claim 11, wherein:
a projection shape of each of the first protrusions on the first surface is a strip shape or a line shape,
a projection shape of each of the second protrusions on the second surface is a strip shape or a line shape,
in the first surface, a minimum clearance between two adjacent first protrusions among the first protrusions is larger than a maximum width of the two adjacent first protrusions, and
in the second surface, a minimum clearance between two adjacent second protrusions among the second protrusions is larger than a maximum width of the two adjacent second protrusions.

16. The lithium secondary battery according to claim 11, wherein:
a total area of projection of the first protrusions on the first surface is 0.2% or more and 70% or less of the area of the first surface, and
a total area of projection of the second protrusions on the second surface is 0.2% or more and 70% or less of the area of the second surface.

17. The lithium secondary battery according to claim 11, wherein the second average height is 15 µm or more and 120 µm or less.

18. The lithium secondary battery according to claim 11, wherein
in each of the first surface and the second surface of the layer, when a direction perpendicular to the winding axis of the electrode group is defined as a length direction, and a direction parallel to the winding axis is defined as a width direction,
at least one band-shaped first region where no first protrusions are formed is disposed on the first surface along at least the length direction or the width direction, and
at least one band-shaped second region where no second protrusions are formed is disposed on the second surface along at least the length direction or the width direction.

19. The lithium secondary battery according to claim 11, wherein:
the nonaqueous electrolyte includes a lithium ion and an anion, and
the anion includes at least one selected from the group consisting of $PF_6^-$, anions of imides, and anions of oxalate complexes.

* * * * *